Nov. 17, 1953  J. M. LITTLE ET AL  2,659,590
WEIGHING SCALE HOUSING
Filed May 2, 1949                    2 Sheets-Sheet 1
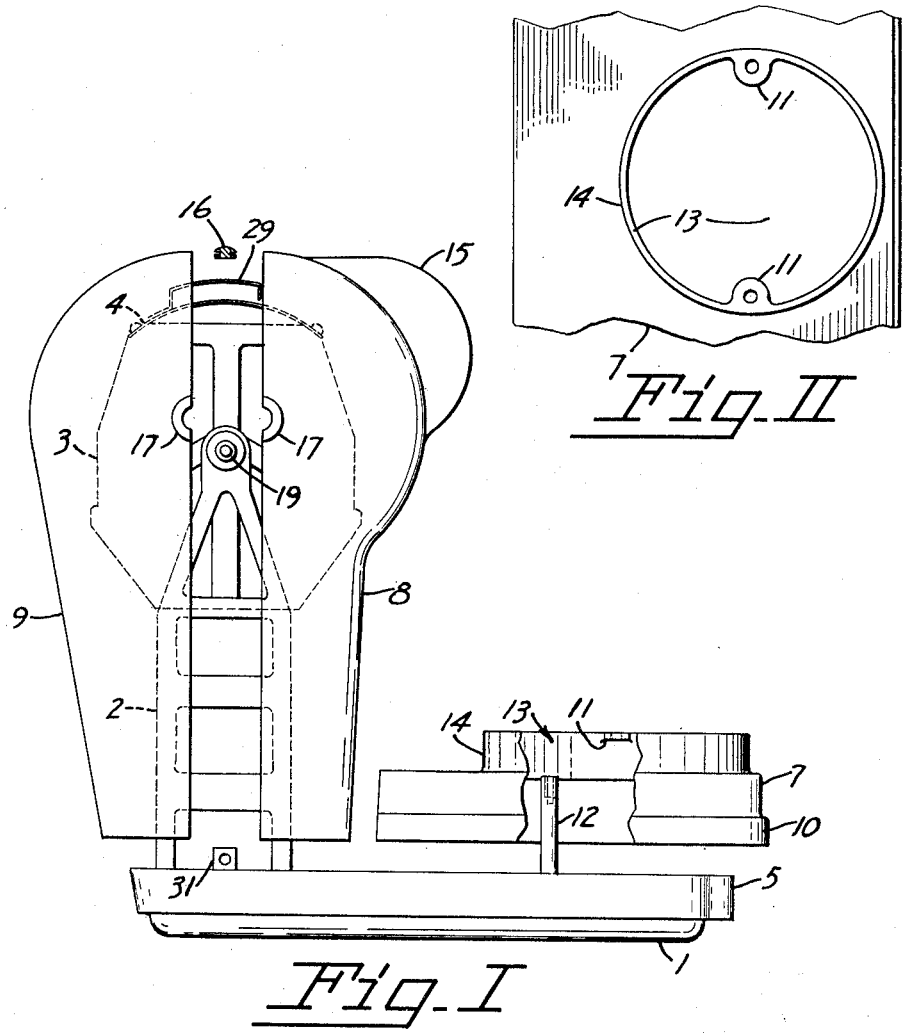
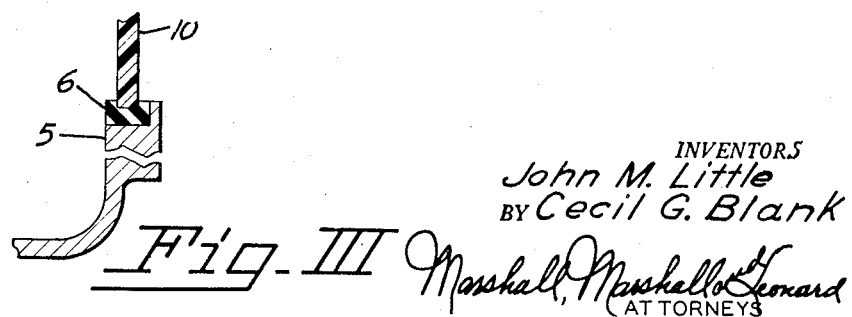
INVENTORS
John M. Little
BY Cecil G. Blank
Marshall, Marshall & Leonard
ATTORNEYS

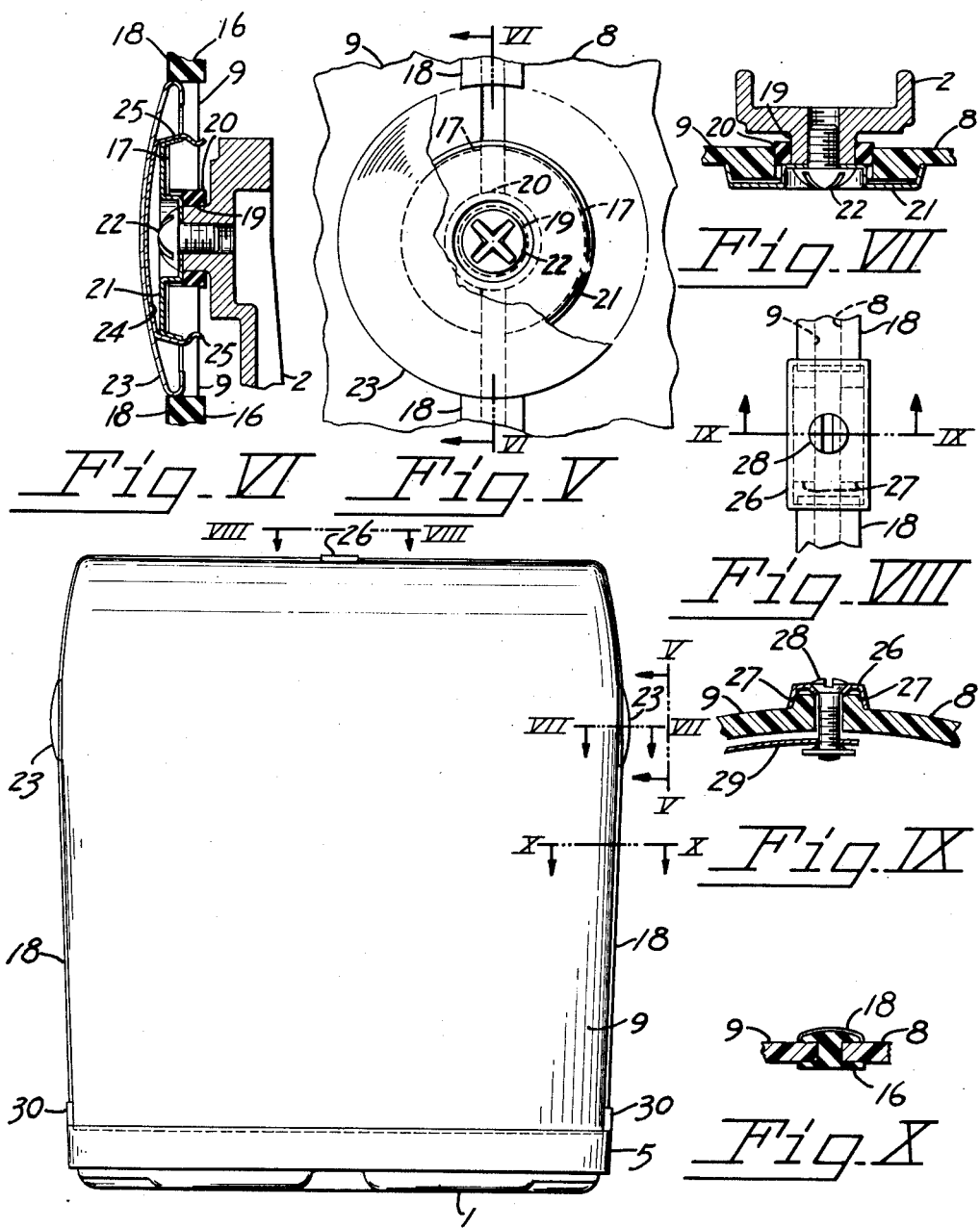

Patented Nov. 17, 1953

2,659,590

UNITED STATES PATENT OFFICE 2,659,590

WEIGHING SCALE HOUSING

John M. Little and Cecil G. Blank, Toledo, Ohio, assignors to Toledo Scale Company, Toledo, Ohio, a corporation of New Jersey Application May 2, 1949, Serial No. 90,888

6 Claims. (Cl. 265—27)

1

This invention relates to weighing scales that are used in retail stores and in particular to an improved housing for such a scale.

In order to reduce the weight of a weighing scale, plastic moldings have been substituted for porcelain finished sheet metal or cast iron housings. Certain difficulties such as the unequal expansion of metal and plastic make it difficult to construct a housing of large size without leaving unsightly cracks (expansion joints) or offsets or visible fastening means at the joints between the various sections of the housing. Thus a weighing scale housing, of which the instant invention is an improvement, comprises ten or more pieces most of which are individually attached to the structural frame of the weighing scale. This type of construction leaves a large number of screw heads visible on the outside of the finished housing.

The principal object of this invention is to provide a housing construction employing molded plastic parts so constructed that a minimum of fastening means are required and so that such fastening means are located in inconspicuous or concealed positions thus leaving a clean substantially uninterrupted exterior for the housing.

A still further object of the invention is to provide a housing mounted assembly that accommodates the difference in expansion of the plastic housing portions and the structural framework of the scale without imposing substantial stresses on either the housing or the frame.

Another object is to provide a housing mounting attachment that serves to hold the housing in place on the structural frame of the scale and to also serve as the base of a decorative medallion that is mounted on the end of the housing generally in line with the axis of the rotatable chart carried in the housing.

More specific objects and advantages are apparent from the following description of a preferred embodiment of the invention.

According to the invention the improved weighing scale housing is formed as a pair of shells, each shell forming half of the housing of the upright portion of the scale and each shell having along the parting line between the shells one or more raised portions that may be engaged and held by U-shaped clips secured to the structural frame of the weighing scale. Some of the raised portions are located beneath the medallions and these portions are preferably semi-annular so that a cupped washer fitted over a pair of them and secured to the frame of the scale serves to hold the shells securely against movement in any

2 direction. The remaining clips and projections have contacting surfaces parallel to the parting line between the shells so as not to unduly restrict expansion of the plastic with respect to the frame.

A weighing scale housing constructed according to the invention is illustrated in the accompanying drawings.

In the drawings:

Figure I is a slightly exploded view of a weighing scale with the housing disassembled and the pieces moved a short distance from their assembled position.

Figure II is a fragmentary plan view of that portion of the housing which covers the forwardly extending portion of the base of the scale.

Figure III is a fragmentary detail showing the joint between the plastic housing portions and the base of the scale.

Figure IV is a back view of the scale to show the location of the various housing clamping members.

Figure V is an enlarged fragmentary elevation with parts broken away showing the principal securing means as seen from the line V—V of Figure IV.

Figure VI is a vertical section of the principal securing means as seen from the line VI—VI of Figure V.

Figure VII is a horizontal section taken through the principal securing means as seen from the line VII—VII of Figure IV.

Figure VIII is a fragmentary plan view of another of the securing means as seen from the line VIII—VIII of Figure IV.

Figure IX is a fragmentary vertical section taken along the line IX—IX of Figure VIII.

Figure X is a fragmentary horizontal section taken along the line X—X of Figure IV.

These specific figures and the accompanying description are intended merely to illustrate the invention but not to limit its scope.

The improved weighing scale insofar as the instant housing is concerned comprises a generally horizontal base 1 and a vertically positioned structural framework 2 that is erected from the rear portion of the base 1. The vertically extending framework 2 includes a pair of chart end frames 3, shown in outline only, which serve to support bearings for a rotatable chart, not shown, and a shield or hood 4 for protecting the upper portion of the chart.

The base 1 is a generally rectangular dish-shaped casting having upstanding walls 5, see also Figure III, that are rabbeted to receive a sponge rubber sealing strip 6 that serves as an elastic joint between the various portions of the housing and the base.

The housing itself comprises three pieces including a first portion 7 of relatively low elevation that covers the forwardly extending part of the base 1 and a pair of shells 8 and 9 which together enclose the vertically extending frames 2 and the chart structure carried thereon. In this type of weighing scale the load receiver is positioned over the low housing portion 7, supported on a lever carried in the dish-shaped base 1, and the load force is applied to a pendulum counterbalancing mechanism supported between the upright frame portions 2. The counterbalancing mechanism drives a cylindrical chart located between the chart frames 3.

The low elevation housing portion 7, also shown in Figure II, has a downwardly depending skirt 10 that rests on the sponge rubber sealing strip 6. The housing 7 is secured in place by screws that pass through ears 11 in the upper surface of the housing 7 and that are threaded into the upper ends of posts 12 erected from the base 1. A circular opening 13 is left through the upper surface of the low housing portion 7 and the load receiver supporting columns extend upwardly through this opening and the load receiver base serves as a cover fitting over an upstanding rim 14 surrounding the opening 13.

The housing shells 8 and 9 together enclose the chart and the counterbalancing mechanism and the shell 8 is further provided with a forwardly and upwardly extending protuberance 15 over which a lens frame may be mounted for providing magnified load indications.

When the shells 8 and 9 are in position over the frames 2 and 3 they are separated a small distance and held in aligned relation by H-shaped rubber moldings 16, one of which is shown in section in the upper part of Figure I. There are four such molding pieces employed, the first of which extends from one side of the base 1 up along the parting line between the shells 8 and 9 to a point just beneath raised annular bosses 17 formed on the shells 8 and 9. The second rubber molding 16 starts just above the bosses 17 and extends upwardly and along the top of the housing nearly to the center of the top. The third piece starts just beyond the center of the top and continues across the top and down the far side to a point just above annular bosses formed on the other end surface of the shells, and the fourth piece of molding continues from just below the annular bosses to the base.

The rubber moldings 16 may be formed with a metallic beading 18 as shown in Figure X. The rubber molding 16 is preferably bonded into the beading 18.

Referring to Figure IV the location of the securing means for the housing shells 8 and 9 is clearly indicated. These shells are held secured at five points, these points being located; two adjacent the upstanding walls 5 of the base 1; two substantially in line with the ends of the axis of the rotatable chart; and one in the middle of the top of the housings. The principal support for locating the housing is provided by the mounting means located adjacent each end of the chart axis. This structure is illustrated in Figures V to VII inclusive. The upper ends of the vertical frames 2 have outwardly directed tenon-like bosses 19 that extend into the plane of the end wall sections of the shells 8 and 9. A rubber collar 20 is fitted over the tenon 19 and the end shells 8 and 9 are fitted against the rubber collar 20 with the material included within the annular bosses 17 cut away so that the inside cylindrical surface formed in the bosses 17 fits snugly against the rubber collar 20. A cup-shaped washer 21, in this instance formed with a raised center, fits over the annular bosses 17 and is secured to the tenon 19 by means of a heavy screw 22. This cup-shaped washer 21 by engaging the annular boss 17 serves to lock and position the housing against movement up or down or sideways and thus provides the fixed point of attachment between the housing and the structural frame of the scale. This type of joint or fastening is very serviceable when used with plastic materials because the stress is distributed over a relatively large area of the plastic material thus avoiding the difficulties ordinarily encountered when threaded inserts must be used in the plastic material or holes threaded directly into the material.

As may be seen in Figure VI the H-shaped rubber moldings 16 are stopped short of the washer 21 thus leaving open spaces between the edges of the shells 8 and 9. A decorative medallion 23 provided with a spring clip 24 fits over the cup-shaped washer 21 with fingers 25 of the clip 24 entering the spaces between the walls of the housing sections 8 and 9 and grasping the edge or rim of the cup-shaped washer. The medallion may be easily removed by merely prying it off.

The connection or securing means at the top of the housing is shown in Figures VIII and IX. This securing means comprises a formed generally U-shaped clip 26 that fits over and engages upstanding lips 27 of the housing shells 8 and 9. As is shown in Figure VIII the H-shaped rubber moldings 16 extend nearly to the ends of the upstanding lips 27 while the U-shaped clip 26 is of sufficient length to cover not only the lips 27 but also the ends of the moldings 16. The clip 26 is secured by a screw 28 that fits through a hole in the clip 26 and passing between the edges of the shells 8 and 9 is threaded into a spring finger 29 that is secured to the chart shell 4 (Figure I) as shown in Figure IX the screw 28 has not been fully tightened but in actual assembly the screw is tightened sufficiently to pull the finger 29 up against the upper surface of the shells 8 and 9.

Other clips 30 similar to the clips 26 are used to secure the housing adjacent the base 1. These clips are attached to upstanding brackets 31 secured in the base 1.

The improved housing mounting means used to secure the shells 8 and 9 of the weighing scale may be varied in detail without departing from the spirit and scope of the invention.

Having described the invention, we claim:

1. In a weighing scale housing, in combination, a pair of shells each constituting half of the enclosure for a chart and weighing mechanism, said shells having generally coplanar surfaces meeting along the parting line and each having part of a boss protruding from the surface and being generally concentric with respect to a center located in the parting line between the shells, a frame member located behind the boss, a clamp that fits over the boss and engages at least those portions of the boss remote from the parting line, and fastening means for securing the clamp to the frame member.

2. In a weighing scale housing, in combination, a pair of shells constituting a portion of a weighing scale housing, H-shaped moldings interposed between the shells along the parting line, raised portions on the shells adjacent the parting line forming a boss concentric with respect to a center located in the parting line between the shells at the ends of the moldings, a frame member behind the parting line, a clip that extends over the raised portion and adjacent ends of the moldings, and fastening means for securing the clip to the frame member.

3. In a weighing scale housing, in combination, a pair of shells constituting a portion of a weighing scale housing, a frame member having a tenon extending into the plane of the shells adjacent their parting line, said shells being notched to receive the tenon, a raised rim surrounding the notches in each shell, a cup-shaped washer engaging the outer edge of the rim, and a fastening means for securing the washer to the tenon.

4. In a weighing scale housing, in combination, a pair of shells constituting a portion of a weighing scale housing, a frame member having a cylindrical tenon extending into the plane of the shells adjacent their parting line, said shells being notched to receive the tenon, a raised rim surrounding the notches in each shell, a cup-shaped washer engaging the outer edge of the rim, and a fastening means for securing the washer to the tenon.

5. In a weighing scale housing, in combination, a pair of shells constituting a portion of a weighing scale housing, H-shaped moldings interposed between the shells along the parting line, a frame member having a tenon extending into the plane of the shells adjacent their parting line, said shells being notched to receive the tenon, a raised rim surrounding the notches in each shell, a cup-shaped washer engaging the outer edge of the rim, and a fastening means for securing the washer to the tenon.

6. In a weighing scale housing, in combination, a pair of shells each constituting half of the enclosure for a chart and weighing mechanism, said shells having generally coplanar surfaces meeting along the parting line between the shells, each shell having at least one interrupted section raised above the level of the shell surface adjacent the parting line, a frame member located adjacent the parting line and behind the raised sections, a clip having a depending rim, said clip bridging the parting line with the rim engaging the raised sections, and fastening means for securing the clip to the frame member.

JOHN M. LITTLE.
CECIL G. BLANK.

References Cited in the file of this patent

UNITED STATES PATENTS

| Number | Name | Date |
|---|---|---|
| 429,660 | Sullivan | June 10, 1890 |
| 1,606,766 | King | Nov. 16, 1926 |
| 1,635,661 | Craig | July 12, 1927 |
| 2,192,720 | Tapman | Mar. 5, 1940 |
| 2,287,814 | Meeker | June 30, 1942 |
| 2,432,257 | Stetzer | Dec. 9, 1947 |
| 2,547,799 | Wering | Apr. 3, 1951 |